Figure 1:
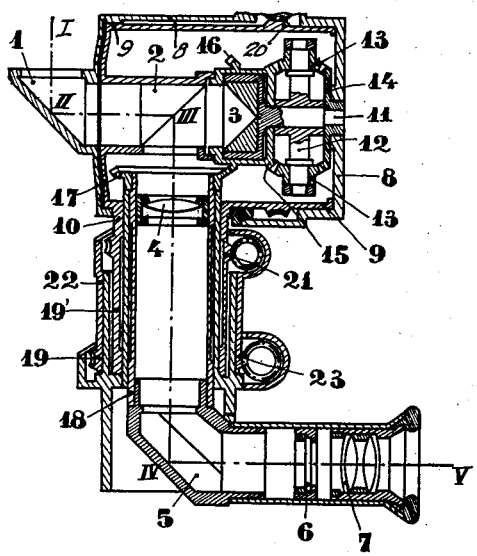

April 4, 1939.  A. BARONI  2,152,726

UNIVERSAL PANORAMIC TELESCOPE

Filed June 18, 1937

Augusto Baroni
by Alfred Müller
Attorney

Patented Apr. 4, 1939

2,152,726

UNITED STATES PATENT OFFICE 2,152,726

UNIVERSAL PANORAMIC TELESCOPE

Augusto Baroni, Rome, Italy

Application June 18, 1937, Serial No. 148,857
In Italy June 18, 1936

1 Claim. (Cl. 88—72)

In articulated telescopes and in periscopes, when it is desired to maintain the ocular in a fixed position, and to effect the exploration (of the horizon or in height) by the rotation of a flat mirror or a mirror prism about an axis (vertical or horizontal) in order to prevent the rotation of the image, use is made, as is well known, of an Amici reversing prism, or any other equivalent optical device which, when inserted in the path of the light rays, is mechanically mounted so as to rotate about the same axis, in the same direction, and with an angular velocity which is half of the velocity of the aforesaid mirror or prism. For this purpose the Amici prism, or its substitute, is usually made integral with the shaft on which is loosely mounted a planet wheel (or two diametrically opposed planet wheels) of a differential gear, of which one of the two planets is fixed (or integral with the ocular, which in this case may also be provided with a certain amount of mobility, independent of the direction of the exploration) the other being integral with the rotation of the mirror, or exploring prism.

This optical-mechanical disposition, although occurring in many other varied applications, is the main feature of the well known panoramic telescope, the use of which in artillery practice has assumed particular importance as it facilitates reference to false scopes placed behind in land shooting with indirect collimation. On account, however, of its limited amount of inclinability in site (± about 15°), the known panoramic telescope must be used as a device with "ordinary" line of collimation, (adjusting the sight and aiming at the target are operations to be effected successively, each variation of sight requiring a new aim), while it would evidently be more practical and rational, that the aiming device be independent of the sight (device with "independent" aiming line). On the other hand, the panoramic telescope could be used advantageously also in the direct aiming of aerial targets; however in that case it is necessary to dispose its principal axis horizontal, which in practice is not possible to do without a radical modification of the construction of the instrument.

The present invention has for its object a new panoramic telescope, which may be termed universal, inasmuch as although maintaining the possibility of exploring all round the horizon without displacing the ocular, it allows of variations in site of more than 90°, while the rotation of the images in their plane is always automatically prevented. The new panoramic telescope serves equally well like the present panoramic telescope, but it is adapted to be used as an aiming device with "independent" aiming line, and it may serve for the direct aiming of targets both on land and in the air without the necessity of any essential modification in its structure, and also, it may be operated as a universal goniometer, and when so used, because of its immobility and the limited mobility of the ocular, it is particularly adapted for direct connection with an automatic or nearly automatic apparatus suitable for calculating the aiming data against aircraft.

The universal panoramic telescope according to the present invention, is a doubly articulated collimating telescope. The ocular branch of the axis of collimation is fixed with respect to the support (or has a limited rotating movement in azimuth independent of the direction of collimation) and the objective branch is rotatable about an horizontal axis, which in its turn may rotate about a vertical axis (principal axis), in a way and with functions perfectly similar to those of a theodolite with eccentric telescope. The movement "in site", of an amplitude of at least 90°, takes place by means of a rotation through an equal angle (and not through half the angle, as in the case of the present panoramic telescope) of an objective or entry prism, about the horizontal axis; the exploration of the direction is effected by rotating about the principal axis the upper portion of the instrument, and along with it, in addition to the objective prism and to its axis of rotation, also a mirror or a reflecting prism integral with it, for the purpose of bending downwards the incidence rays, so that these latter, after traversing an objective lens, may arrive, after having been reflected on another mirror, or a reflecting prism integral with the ocular, to form on the plane of a sighting mark, the image of distant objects. Each of the two rotations above mentioned, would produce a rotation of equal angular value in the image seen through the fixed ocular, and in order to eliminate it, it would appear necessary to apply two optic-mechanical rectifying apparatus, similar to those used in the ordinary panoramic telescope, one for compensating the rotatory optical effect of the movement of direction, and the other for compensating the said effect of the movement in site, a solution, however, which although theoretically correct, could not be accepted in practice for obvious reasons. However, as the two disturbing causes which have to be eliminated, are homogeneous and produce effects which are compounded in a simple algebraical addition, it is possible to obtain the complete and continuous elimination of the rotations of the images in its plane, by the use of a single optical-mechanical rectifying device, the rotatable element of which is controlled by the revolution of the planet of a differential gearing (epicyclical spherical gear of the differential automobile type) the planetary wheels of which are suitably connected with the rotation in site of the objective prism and with the azimuthal rotation of the upper portion of the instrument. The optical rotatable element may consist of the usual Amici reversing prism, or the known combination of two cylindrical lenses, or also the double reflecting mirror-prism forming the object of my application Serial No. 148,856 filed June 18, 1937. In this latter case, the said prism or reflecting mirror participating in the azimuth rotation, must be replaced by a translucent or semi-reflecting mirror, or by the cube formed by two isosceles rectangular prisms glued together on their respective hypothenuse faces, one of which is previously partly silvered, as described in my said application. By way of example, a description is given hereinunder of two possible methods of realization of the present invention, with reference to the accompanying drawing, each figure of which shows schematically the main section of a universal panoramic telescope.

Figure 2:
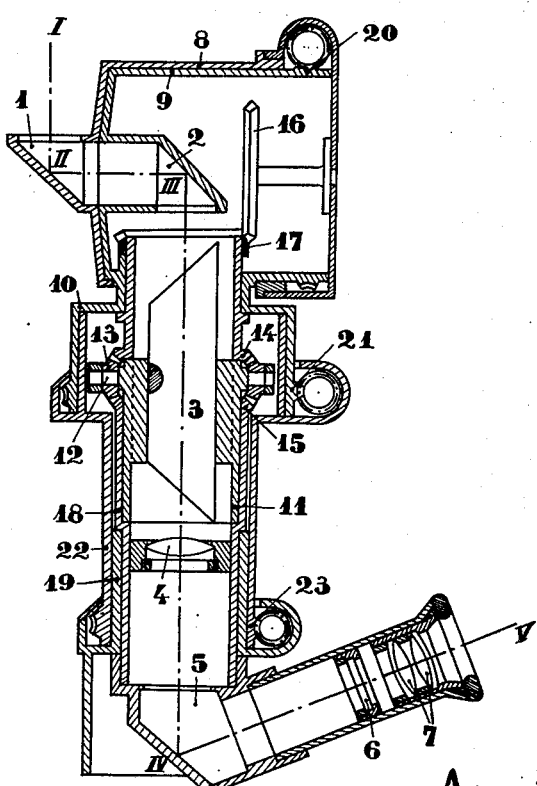

Fig. 1 showing a form of construction obtained by the application of the compensating device disclosed in my above said application, Fig. 2 showing a similar construction in which the compensating device is formed with the usual Amici reversing prism.

It is to be noted that in both figures the objective prism, for better clearness and evidence, has been shown directed towards the zenith, while because of the position of the remaining optical composite it is to be understood that it is to be rotated 90° forward about its horizontal axis of rotation, or even by leaving unaltered the zenithal orientation of the objective prism, all the upper portion of the instrument must be supposed to be rotated in azimuth 90°, without a change in the relative positions of the prisms 1, 2 and 3, so that the plane of collimation may coincide with the plane of the drawing, instead of being normal thereto as shown in the two figures of the drawing.

In the first embodiment shown in Fig. 1 the objective prism 1 bends by 90° the incident light rays, directing them through the translucent and semi-reflecting cube 2, in the double reflecting mirror prism 3, which returns the rays in the cube 2, the latter acting as a mirror, returns the rays in the direction III—IV through the objective lens 4, they strike subsequently the roofed prism 5, which deviates them towards the plate of the sighting mark 6, placed in correspondence of the focal plane of the objective 4, reaching finally the ocular 7. The course of the axis of collimation, individuated by the rear nodal point of the objective 4 and by the centre of the sighting mark 6, is shown by the orthogonal broken line I—II—III—IV—V, of which I—II is the objective branch; II—III coincides with the horizontal axis of the rotation in situ, III—IV forms the vertical axis (principal axis of the instrument) around which revolves in azimuth the system of the two preceding axes; IV—V is the ocular branch of the axis of collimation, which may be fixed with respect to the support of the instrument, or may also have a limited rotation about the principal axis independent of the direction of collimation. Be it supposed that in Fig. 1, the upper portion comprising the prisms 1, 3 and the cube 2, be rotated 90° in the way above specified, it is obvious that the whole of the four reflections, which are parallel in pairs, has no influence on the orientation of the image; on the other hand the combination of the dioptric system 4—7, acting as an astronomical telescope with the roofed prism 5, supplies upright images. The images will maintain themselves upright, whichever is the direction and the site of the objective branch I—II of the axis of collimation, if to the two rotations about the axes II—III and III—IV, with which from the position above indicated (azimuth 0°, site 90°) the new position is reached, are followed at the same time a rotation of the mirror-prism 2, in agreement with, and of half the angular value with respect to the algebraical sum of the two said rotations, considering that two rotations effected about axes orthogonal to each other and intersecting on a reflecting bisector plane, may be taken to be in agreement if the direction of one or the other is equal to the direction of the virtual image of the other rotation. In the case above set forth of a limited mobility of the ocular, in order that the image may not undergo, because of this fact, any rotation in its plane, it is required that the mirror-prism 3 is forced to rotate in the same direction and through half the angular value, also with respect to the azimuthal rotation of the ocular itself.

Having thus described the optical operation of the device, the mechanical construction of it as shown in Fig. 1 will be readily understood. The objective prism 1 is rigidly fixed on the outer cylindrical box 8, which can rotate about the horizontal axis II—III with respect to the internal cylindrical co-axial box 9, acting as a pivot, and being integral with the tube 10, rotatable about the vertical axis III—IV. On the box 9 is rigidly fixed the mounting of cube 2, the translucent and semi-reflecting diagonal plane of which bisects the external right angle formed by the axes II—III and III—IV. To the face of first emergence of the cube 2, there is opposed the face of incidence and of emergence of the roofed mirror-prism 3, rotatable about the axis II—III, by means of the pivot 11 integral with its mounting (externally cylindrical) and with the small shaft 12, on which are loosely mounted the two diametrically opposed planets 13 of a differential gearing, the planetary wheel 14 of which, is fixed co-axially with the box 8, and consequently participates in the rotation in site of the objective prism 1, the other planet wheel 15, being integral with the co-axial toothed bevel wheel 16 which, rotating loosely on the mounting of prism 3, meshes with an identical bevel wheel 17 fixed on the upper end of the tube 18, which carries the objective 4, and on which are rigidly fixed the mounting of the roofed prism 5, and the tube carrying the cross lines 6, and the ocular 7. The tube 18 is partially rotatable by hand, together with the ocular, inside the tube 19, which at the same time operates also as a pivot for the rotation of the tube 10, and in its lower portion provides the attachment for the support of the instrument. The rotation of the box 8, with respect to the box 9, is effected by means of a clutch mechanism 20, formed with an endless screw and helicoidal toothed crown. Another similar mechanism 21, serves for controlling the rotation of the tube 10 in relation to another tube 22, which in its turn, because of its being mounted on a cylindrical coating 19', co-axial and integral with the tube 19, may rotate with respect to the latter, by means of a third mechanism 23, which is similar in every respect to those previously described. The limited amount of rotation of the ocular is useful, particularly when, because of insufficient spacing between the ocular and the objective prism, the back vision may be impeded by the head, or by the head-cover (helmet), of the observer, which in such case will be able to displace himself sideways so as to effect freely the observation. The double control of the azimuthal movement, serves on artillery land shooting, to introduce separately the data of "parallelism" and of "direction".

In respect of the use of the device for aiming at aircraft, it is necessary to be able to connect directly the movement in site of the piece, with that of the box 8, and to maintain the operation of mechanism 20 for introducing the variation in site; moreover, as the mechanical transmission of the site, above mentioned, must be effected without preventing the necessary introduction of the variation of direction, (for which one of the two azimuthal movements controlled by mechanisms 21 and 23, can be used) it will be necessary, as it is known, to insert suitably a differential gearing, to which only mention is here made, in order to remain within the limits of the present invention, observing only that its use in connection with the new panoramic telescope, may readily be made, and does not involve any essential alterations in its general structure.

With regard to the operation of the optical-mechanical rectifying apparatus, it is clear that by rotating in site the objective prism 1, and with it the planet wheel 14, the box 9, and consequently the planet 15 being supposed to be standing, the roofed mirror-prism 3 will rotate through half the angle in the same direction, while the box 9 will rotate in azimuth, when the objective prism 1 and consequently the planet 14 are supposed to be standing. The toothed bevel wheel 16, rotating on to the wheel 17, will cause the rotation through the same angle of planet wheel 15, and therefore prism 3 will rotate by half the angle in the same direction, having regard to the convention above set forth regarding the directions of rotation about axes disposed at right angle to each other. If now the rotations in site and in azimuth operate simultaneously on the planet wheels of the differential gear, they will cause the rectifying prism 3 to rotate according to half the algebraical sum of the two rotations, therefore, if in any one position the images are upright, they will remain automatically as such, whichever be the position assumed in space by the objective branch of the collimation axis. On this position, an eventual rotation of the ocular 7 has obviously no influence, and consequently also that of prism 5, about the axis III—IV, and the rotation of the image that it would tend to produce, is automatically compensated by the rotation, through an equal angle, induced by the toothed bevel wheel 17, on the planet wheel 15, which in its turn causes the rotation through half the angle, and in the same direction, of prism 3. The instrument will be completed with suitable indexes and graduated drums, for the reading of the angular measures. Because of the fact that the useful excursion in site is limited to about 90°, it is required that the box 8 should be provided with a suitable window having a corresponding amplitude, so that its rotation may not be prevented by the collar connecting tube 10 to the internal cylindrical box 9.

In the second embodiment shown in Fig. 2 the objective prism 1 bends by 90° the incident light rays in the horizontal direction II—III, from which they are returned to the horizontal direction III—IV of the prism 2; subsequently passing through the Amici reversing prism 3, and then through the objective lens 4, and the single prism with total reflection 5, which latter serves to bend them towards the plate of the cross lines 6, and the ocular 7. The path of the axis of collimation, similarly to that indicated in the preceding example, is shown by the broken line I—II—III—IV—V. Be it supposed in the present case also, that the upper portion of the instrument be rotated by 90°, together with the prisms 1, 2 and 3 in the arrangement as shown in the figure, it is obvious that the two first prisms do not influence the orientation of the image, while the combination of the dioptric system 4—7, acting as an astronomical telescope with the two prisms 3 and 5, the complex of which in their respective position above set forth is equivalent to a roofed prism, provides upright images, which will remain such in any other spatial position of the objective branch of the axis of collimation, whenever the prism 3 is connected so as to rotate in the same way as described in the previous embodiment of the device. In fact, the objective prism 1 is rigidly fixed on the box 8, which may rotate about the horizontal axis II—III with respect to the internal co-axial box 9, operating as a pivot, and being integral with the tube 10 rotatable about the principal axis III—IV. To the box 9, the mounting of prism 2 is rigidly fixed. The Amici prism 5, the reflecting face of which is parallel to the axis III—IV, is rotatable about this axis by means of its tubular mounting 11, from the upper part of which project at right angles the two diametrically opposed pivots 12 of the planet wheels 13, forming part of a differential gear, the planet 14 of which is integral with the toothed bevel wheel 17 meshing with the identical toothed bevel wheel 16a, coaxial with, and rigidly fixed to, the box 8, while the other planet 15 is fixed at the upper end of tube 18, which carries the objective 4, to which are rigidly fixed the mounting of prism 3, the tube carrying the cross lines 6, and the ocular 7. The tube 18 has a limited manual rotation, together with the ocular, inside the tube 19, which in its lower portion provides the attachment for the support of the instrument. The controls for the movements in site 20, and for the double azimuthal movement 21, 23, correspond to those already described in connection with the first example of realization.

The operation of the optical-mechanical rectifying device is as follows: when rotating in site the objective prism 1, and consequently also the auxiliary toothed wheel 16a, the planet wheel 14 will be carried in rotation by the same angle, and therefore, as the planet wheel 15 is fixed, the Amici prism 3 will rotate by half the angle; if instead the box 9 is rotated in azimuth, supposing that the objective prism 1 is not varied in site, and that the planetary wheel 15 is standing, planet wheel 14 will rotate through the same angle, and consequently the Amici prism 3 will rotate through half the angle. The direction of both said rotations of the Amici prism is the same as that of the respective rotations in site of prism 1, and in azimuth of the box 9, having regard to the convention above stated respecting orthogonal rotations. If now the above indicated rotations in site and in azimuth operate simultaneously on the auxiliary wheel 17, and consequently on the planet wheel 14, always supposing that the planet wheel 15 is fixed, the Amici prism 3 will be caused to be rotated by an amount equal to half the algebraical sum of the values of the component rotations, and in the corresponding direction; however, if in any one position the images are upright, they will maintain themselves automatically as such for any other spatial position of the objective branch of the collimating axes. On this position, an eventual rotation of the ocular 7 round the axis III—IV, has no influence whatsoever, as such rotation, causing at the same time the rotation by an equal angle of the planet wheel 15, will impart directly to the Amici prism a rotation by half the angle in the same direction as the latter, adding itself algebraically to half the sum above mentioned, and will prevent the rotation of the image caused by the displacement in direction of the ocular.

Both types of construction, which have been hereinbefore summarily described by way of example, and which are not intended to limit the possible embodiments of the device according to the present invention, are optically and mechanically equivalent, and particularly, only practical considerations may be considered for preferring the use of the Amici prism, or the double reflecting mirror prism according to my application Serial No. 148,856 filed June 18, 1937, or of any other equivalent optical-mechanical rectifying device.

I claim:

In a panoramic telescope, an optical system including an entrance reflector, a transparent reflector and a reversing prism, means mounting said entrance reflector and said transparent reflector and said prism for collective rotation about a vertical axis, means mounting said entrance reflector and said reversing prism for rotation about a horizontal axis, and a differential gear mechanism interconnecting said reflectors and prism and effective to maintain the amplitude of rotation of the reversing prism about said horizontal axis always one-half of the sum of the amplitudes of rotation of the entrance and transparent reflectors about said horizontal and vertical axes, whereby the telescope is adapted for exploring both horizontally and vertically and whereby the image always is maintained erect.

AUGUSTO BARONI.